United States Patent
Siegers et al.

(10) Patent No.: US 9,371,443 B2
(45) Date of Patent: Jun. 21, 2016

(54) PROCESS FOR CONTINUOUS PRODUCTION OF HALOGEN-FREE THERMOPLASTIC ELASTOMER COMPOSITIONS

(71) Applicant: LANXESS Butyl Pte. Ltd., Singapore (SG)

(72) Inventors: Conrad Siegers, London (CA); Ralf-Ingo Schenkel, Lagenfeld (DE); Rayner Krista, Strathroy (CA)

(73) Assignee: ARLANXEO Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/345,999

(22) PCT Filed: Sep. 28, 2012

(86) PCT No.: PCT/CA2012/000909
§ 371 (c)(1),
(2) Date: Mar. 20, 2014

(87) PCT Pub. No.: WO2013/044370
PCT Pub. Date: Apr. 4, 2013

(65) Prior Publication Data
US 2014/0228521 A1 Aug. 14, 2014

(30) Foreign Application Priority Data
Sep. 28, 2011 (EP) .................................... 11183163

(51) Int. Cl.
| | | |
|---|---|---|
| *C08J 3/20* | (2006.01) | |
| *C08J 3/24* | (2006.01) | |
| *C08L 23/22* | (2006.01) | |
| *C08L 51/08* | (2006.01) | |
| *C08L 77/00* | (2006.01) | |
| *C08L 51/04* | (2006.01) | |
| *C08F 8/46* | (2006.01) | |
| *C08F 291/02* | (2006.01) | |
| *C08F 255/10* | (2006.01) | |

(52) U.S. Cl.
CPC . *C08L 51/04* (2013.01); *C08F 8/46* (2013.01); *C08F 255/10* (2013.01); *C08F 291/02* (2013.01); *C08L 23/22* (2013.01); *C08L 77/00* (2013.01)

(58) Field of Classification Search
CPC ...... C08L 23/22; C08L 23/26; C08L 2205/05
See application file for complete search history.

(56) References Cited

U.S. PATENT DOCUMENTS

| | | | |
|---|---|---|---|
| 2,972,600 A | 2/1961 | Braidwood | |
| 3,287,440 A | 11/1966 | Giller | |
| 3,862,265 A | 1/1975 | Steinkamp et al. | |
| 4,749,505 A | 6/1988 | Chung et al. | |
| 4,810,752 A | 3/1989 | Bayan | |
| 4,978,714 A | 12/1990 | Bayan et al. | |
| 5,013,793 A | 5/1991 | Wang et al. | |
| 5,021,500 A | 6/1991 | Puydak et al. | |
| 5,100,947 A | 3/1992 | Puydak et al. | |
| 5,159,014 A * | 10/1992 | Tsutsumi et al. | 525/66 |
| 5,936,028 A | 8/1999 | Medsker et al. | |
| 5,952,425 A | 9/1999 | Medsker et al. | |
| 6,334,919 B1 | 1/2002 | Takeyama et al. | |
| 8,158,721 B2 | 4/2012 | Stevenson et al. | |
| 2003/0017223 A1* | 1/2003 | Tasaka et al. | 425/88 |
| 2008/0076879 A1 | 3/2008 | Resendes et al. | |
| 2009/0018289 A1 | 1/2009 | Resendes et al. | |
| 2011/0054093 A1* | 3/2011 | Ellul et al. | 524/168 |

FOREIGN PATENT DOCUMENTS

| | | |
|---|---|---|
| CA | 2458741 | 8/2005 |
| EP | 1669395 A1 | 11/2005 |
| JP | 55123639 | 9/1980 |
| JP | 11302455 | 2/1999 |
| JP | 2006176575 A | 7/2006 |
| WO | 2005097887 A1 | 10/2005 |
| WO | 2007111584 A1 | 4/2007 |

OTHER PUBLICATIONS

Tsou et al., Reactive Compatibilization in Brominated Poly(isobutylene-co-p-methylstyrene) and Polyamide Blends, Macromol.Chem Phys, 2009, 210 pp. 340-348, Wiley-Vch Verlag GmbH & Co., KGaA, Weinheim.
European Search Report from co-pending Application EP11183163 dated Apr. 5, 2012, 2 pages.
European Search Report from co-pending European application No. 12836331.4, dated Aug. 25, 2015, four pages.

* cited by examiner

*Primary Examiner* — Ana Woodward

(57) ABSTRACT

A continuous process for the production of a dynamically vulcanized thermoplastic elastomer comprising a thermoplastic resin and a non-halogenated elastomer with a multi-olefin content of greater than 3.5 mol % that has been modified in situ with a carboxylic anhydride. The process provides materials with improved elongation at break and ultimate tensile strength that can be produced economically and with reduced environmental impact.

20 Claims, No Drawings

PROCESS FOR CONTINUOUS PRODUCTION OF HALOGEN-FREE THERMOPLASTIC ELASTOMER COMPOSITIONS

FIELD OF THE INVENTION

The present invention relates to thermoplastic elastomer (TPE) compositions and processes for the continuous production of those compositions. More particularly, the present invention is directed to a thermoplastic elastomer composition comprising a thermoplastic, such as a polyamide, and a non-halogenated isobutene containing elastomer, such as butyl rubber, that has been modified with an unsaturated carboxylic anhydride. The invention also relates to continuous processes for producing said thermoplastic elastomeric compositions using, for example, extruders.

BACKGROUND

Thermoplastic elastomer compositions are hybrid materials of thermoplastic and elastomeric polymers. Thermoplastic elastomer compositions combine desired properties of thermoplastics, for example processability via injection molding or film blowing and/or recyclability, with desired properties of elastomers, for instance high elongation at break, low tensile set and good flex-fatigue resistance.

There are several classes of thermoplastic elastomers. One subset of thermoplastic elastomers are thermoplastic vulcanisates (TPVs), where the elastomeric polymer is dispersed in the thermoplastic phase in the form of discrete vulcanized particles. TPVs are produced by melt-blending thermoplastics with elastomers and curatives in a dynamic vulcanization process. Therefore TPVs are also referred to as dynamically vulcanized alloys (DVAs).

Thermoplastic elastomer compositions from barrier thermoplastics and isobutylene-based elastomers have been considered in industrial applications requiring flexibility and impermeability. EP 0 722 850 B1 discloses a low-permeability thermoplastic elastomeric composition that is excellent as an innerliner in pneumatic tires. This composition comprises a low permeability thermoplastic in which is dispersed a low permeability rubber. EP 0 969 039 A1 discloses a similar composition and teaches that the small particle size rubber dispersed in the thermoplastic was important to achieve acceptable durability of the resulting composition.

Thermoplastic elastomeric compositions particularly useful for tire and other industrial rubber applications have been commercialized by Exxon under the trade name Exxcore DVA Resin. The production of the Exxcore DVA Resin relies on a dynamic vulcanization process for combining a brominated copolymer of isobutylene and methylstyrene (BIMSM) with nylon at a temperature above the nylon melt temperature.

The literature (Bhadane, P. A.; Tsou, A. H.; Cheng, J. and B. D. Favis, *Macromolecules* 2008, 41, 7549-7559, Tsou, A. H.; Favis, B. D.; Hara, Y.; Bhadane, P. A. and Y. Kirino. *Macromol. Chem. Phys.* 2009, 210, 340-348; WO2009151859A1) teaches that amine-end groups on the nylon react with the bromomethyl groups on the BIMSM, thereby forming a polyisoprene molecule to which nylon chains have been covalently grafted. Once formed, this graft polymer acts as compatibilizer between the apolar isobutylene containing polymer and the polar barrier thermoplast (nylon). The formation of this graft polymer, which is formed in an in-situ process, is important for the production of a thermoplastic elastomer composition with small particle size rubber dispersed in the thermoplastic. Hence, the grafting reaction between thermoplast and elastomer is important to achieve acceptable durability of the resulting composition in industrial applications. BIMSM, however, is produced in a two-step process comprising (i) the cationic polymerization of isobutylene and methylstyrene to poly(isobutylene-co-methylstyrene) and (ii) bromination of poly(isobutylene-co-methylstyrene) to BIMSM.

EP 0361769 B1 teaches a two-step process for preparing a nylon butyl rubber blend consisting in step (i) preparing a modified butyl rubber by grafting maleic anhydride to chlorinated or non-halogenated butyl rubber and step (ii) the melt-blending of the modified butyl rubber with nylon. The resulting blends offer superior physical properties and superior impermeability compared to a similar blend relying on chlorobutyl rubber and non-halogenated butyl rubber. The processes described in EP 0361769 B1, however, requires at least two different mixing steps in order to achieve the preparation of a nylon butyl rubber blend with desired properties.

WO2009151859A1 describes a process for producing a dynamically vulcanized alloy, the alloy comprising at least one isobutylene-containing elastomer and at least one thermoplastic resin in melt-processing devices (extruders). WO2009151859A1 does not teach grafting reactions between a thermoplastic and non-halogenated polyisobutylene elastomers or butyl rubber elastomers.

US20110054093 describes the use of maleic anhydride modified oligomers, notably polyisobutylene oligomers, in thermoplastic elastomer compositions to match the melt viscosities of the elastomeric and thermoplastic phases. US20110054093 does not teach grafting reactions between a thermoplastic and non-halogenated polyisobutylene elastomers or butyl rubber elastomers.

US 2008076879 (A1) discloses peroxide cured thermoplastic vulcanizates comprising a thermoplastic and an isomonoolefin-multiolefin elastomer, such as butyl rubber. More particularly, the invention relates to peroxide cured thermoplastic vulcanizates wherein the elastomer comprises at least 3.5 mol % of multiolefin in order to facilitate peroxide curing. These thermoplastic vulcanizates are halogen-free.

To improve efficiency and environmental impact it is desirable to provide a process to produce a thermoplastic elastomeric composition using non-halogenated isobutylene-containing elastomers, particularly butyl elastomers, with minimal process steps. Thereby the resources and energy expedited for the modification processes, such as bromination and maleation, applied to the non-halogenated elastomers in order to make them suitable for TPE production would be eliminated. Also, by avoiding the use of halobutyl rubber or regular butyl rubber with sulfur-based curatives in a thermoplastic elastomer composition one also removes the possibility of having the finished article contaminated with extractable organic and/or inorganic halides or sulfides. These enhancements would be of particular benefit for pharmaceutical and consumer goods applications.

SUMMARY OF THE INVENTION

The present invention provides a novel approach for preparing thermoplastic elastomer compositions from non-halogenated isoolefin polymers by incorporating an unsaturated carboxylic anhydride into the thermoplastic elastomer. Without wishing to be bound by theory, it is hypothesized that the grafting material covalently binds to the elastomer via a free-radical grafting process, and covalently binds to the thermoplastic via a condensation reaction between functional groups of the thermoplastic (i.e. $NH_2$, OH, $CO_2H$). Without wishing to be bound by theory, the compatibilization of the elastomer and thermoplastic phases is a result of the covalent link forming between the thermoplastic and the elastomer resulting in a tensile strength and elongation at break superior to that of a reference material that does not contain grafting material.

The elastomers and thermoplastics of the present invention may be blended to form a dynamically vulcanized alloy. The term "dynamic vulcanization" is used herein to connote a vulcanization process in which the vulcanizable elastomer is vulcanized in the presence of a thermoplastic under conditions of high shear and elevated temperature. As a result, the vulcanizable elastomer is simultaneously crosslinked and preferably becomes dispersed as fine sub micron size particles of a "micro gel" within the thermoplastic. The resulting material is often referred to as a dynamically vulcanized alloy ("DVA").

Dynamic vulcanization is effected by mixing the ingredients at a temperature which is at or above the curing temperature of the elastomer, and also above the melt temperature of the thermoplastic component, in equipment such as roll mills, Banbury™ mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional thermoplastic processing techniques such as extrusion, injection molding, compression molding, etc. Scrap or flashing can also be salvaged and reprocessed; those skilled in the art will appreciate that conventional elastomeric thermoset scrap, comprising only elastomer polymers, cannot readily be reprocessed due to the cross-linking characteristics of the vulcanized polymer.

According to an aspect of the present invention, there is provided a continuous process for the preparation of a thermoplastic elastomer composition comprising the steps of: providing a thermoplastic resin; providing a non-halogenated elastomer comprising repeating units derived from at least one $C_4$ to $C_7$ isomonoolefin monomer and at least 3.5 mol % of a $C_4$ to $C_{16}$ multiolefin monomer; providing an unsaturated carboxylic anhydride having 4 to 16 carbon atoms; admixing in a first stage of a continuous mixer the thermoplastic resin, the elastomer and the carboxylic anhydride to create a thermoplastic elastomer composition comprising the carboxylic anhydride grafted to the elastomer; admixing in a second stage of the continuous mixer a curing system suitable for use with non-halogenated elastomers to dynamically vulcanize the thermoplastic elastomer.

According to another aspect of the invention, there is provided a peroxide cured thermoplastic vulcanizate comprising: a thermoplastic; a non-halogenated elastomer comprising repeating units derived from at least one $C_4$ to $C_7$ isomonoolefin monomer and at least 3.5 mol % of repeating units derived from at least one $C_4$ to $C_{16}$ multiolefin monomer; and an unsaturated carboxylic anhydride.

According to yet another aspect of the invention, there is provided a thermoplastic vulcanizate prepared by: providing a thermoplastic; providing a non-halogenated elastomer comprising repeating units derived from at least one $C_4$ to $C_7$ isomonoolefin monomer and at least 3.5 mol % of repeating units derived from at least one $C_4$ to $C_{16}$ multiolefin monomer; providing a thermally activated peroxide curing system and an unsaturated carboxylic anhydride; and, mixing the thermoplastic and the non-halogenated elastomer together with the peroxide curing system and the unsaturated anhydride at a temperature of from 100 to 260° C. in order to form the thermoplastic vulcanizate in one mixing step.

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

DETAILED DESCRIPTION OF THE INVENTION

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e. a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Rubber refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent . . . ". Rubbers are often also referred to as elastomers; the term elastomer may be used herein interchangeably with the term rubber.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

The elastomer is a copolymer of an isoolefin and multiolefin. Isoolefin refers to any olefin monomer having at least one carbon having two substitutions on that carbon. Multiolefin refers to any monomer having two or more double bonds. In a preferred embodiment, the multiolefin is any monomer comprising two conjugated double bonds such as a conjugated diene like isoprene.

The invention is not limited to a special isoolefin or isomonoolefin. However, isomonoolefins within the range of from 4 to 16 carbon atoms, in particular 4-7 carbon atoms, such as isobutene, 2-methyl-1-butene, 3-methyl-1-butene, 2-methyl-2-butene, 4-methyl-1-pentene and mixtures thereof are preferred. Most preferred is isobutene, also referred to as isobutylene. Isobutylene based elastomer or polymer refers to elastomers or polymers comprising at least 70 mol % repeat units from isobutylene.

The invention is not limited to a special multiolefin. Every multiolefin copolymerizable with the isoolefins known by the skilled in the art can be used. However, multiolefins within the range of from 4-16 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, in particular conjugated dienes, are preferably used. Isoprene is particularly preferably used.

In the present invention, β-pinene can also be used as a co-monomer for the isoolefin. As optional monomers every monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used in this invention.

The multiolefin content is at least greater than 3.5 mol %, more preferably greater than 4.0 mol %, yet more preferably greater than 4.5 mol %, even more preferably greater than 5.0 mol %, still more preferably greater than 6.0 mol %, yet even more preferably greater than 7.0 mol %, still yet more preferably greater than 7.5 mol %.

The butyl polymer may further comprise units derived from one or more multiolefin cross-linking agents. The term cross-linking agent is known to those skilled in the art and is understood to denote a compound that causes chemical cross-linking between the polymer chains in opposition to a monomer that will add to the chain. Some easy preliminary tests will reveal if a compound will act as a monomer or a cross-linking agent. The choice of the cross-linking agent is not particularly restricted. Preferably, the cross-linking comprises a multiolefinic hydrocarbon compound. Examples of these are norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is divinylbenzene, diisopropenylbenzene, divinyltoluene, divinylxylene and $C_1$ to $C_{20}$ alkyl substituted derivatives thereof, and or mixtures of the compounds given. Most preferably the multiolefin crosslinking agent comprises divinylbenzene and/or diisopropenylbenzene.

The weight average molecular weight, $M_w$, of the elastomer is preferably greater than 240 kg/mol, more preferably greater than 300 kg/mol, yet more preferably greater than 500 kg/mol, even more preferably greater than 600 kg/mol, still more preferably greater than 700 kg/mol.

For purposes of the present invention, a thermoplastic (alternatively referred to as thermoplastic resin) is a thermoplastic polymer, copolymer, or mixture thereof having a Young's modulus of more than 200 MPa at 23° C. The resin should have a melting temperature of about 170° C. to about 260° C., preferably less than 260° C., and most preferably less than about 240° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with an aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyiene-adipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene) $C_2$ to $C_6$ alkane dicarboxylates such as poly(trans-1,4-cyclohexylene succinate) and poly(trans-1,4-cyclohexylene adipate); poly(cis or trans-1,4-cyclohexanedimethylene)alkanedicarboxylates such as poly(cis-1,4-cyclohexanedimethylene)oxlate and poly-(cis-1,4-cyclohexanedimethylene)succinate, poly($C_{2-4}$ alkylene terephthalates) such as polyethyleneterephthalate and poly-tetramethylene-terephthalate, poly($C_{2-4}$ alkylene isophthalates such as polyethyleneisophthalate and polytetramethyl-ene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

Ethylene copolymer resins useful in the invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g. acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

Preferably the thermoplastic may be present in an amount ranging from about 10 to 98 wt %, preferably from about 20 to 95 wt %, the elastomer may be present in an amount ranging from about 2 to 90 wt %, preferably from about 5 to 80 wt %, based on the polymer blend.

In another aspect of the invention, the thermoplastic elastomer composition contains a $C_4$ to $C_{16}$ unsaturated carboxylic acid derivative. Any compound that combines a C═C double bond and a carboxylic acid or carboxylic acid derived group in the same molecule can be used according to the present invention. The carboxylic acid derived group may be selected from the list of carboxylic acid, carboxylic amides, carboxylic esters and carboxylic anhydrides. The unsaturated carboxylic acid derivatives may be selected from the group consisting of maleate, chloromaleate, itaconate, acrylate, methacrylate, hemic acid salts or the corresponding carboxylic acids, amides, esters and anhydrides, and their $C_1$ to $C_{16}$ alkyl-substituted derivatives. Preferably, the carboxylic acid derivative is an anhydride. More preferably the unsaturated carboxylic acid derivative is a cyclic anhydride. The unsaturated carboxylic acid derivative may be selected from the group consisting of maleic anhydride, chloromaleic anhydride, itaconic anhydride, hemic anhydride or the corresponding dicarboxylic acids, such as maleic acid or fumaric acid, or their esters. Most preferably the unsaturated carboxylic acid derivative is maleic anhydride.

To aid in the grafting reaction, a peroxide initiator may also optionally be introduced during admixing of the carboxylic anhydride grafting material with the elastomer. These peroxides may be the same or different. Suitable peroxides according to the invention are preferably thermally activated. Inorganic or organic peroxides are suitable. Preferred are thermally activated organic peroxides such as dialkylperoxides, ketalperoxides, aralkylperoxides, peroxide ethers or peroxide esters. Examples of peroxides suitable for use in the peroxide curing system include 2,5-dimethyl-2,5-di-(tert-butylperoxy)hexyne-3, di-tert-butyl peroxide, 2,5-dimethyl-2,5-di(tert-butylperoxy)hexane, tert-butyl cumyl peroxide, di-(2-tert-butylperoxy isopropyl)benzene, dicumyl peroxide, butyl 4,4-di-(tert-butylperoxy)valerate, 1,1-di-(tert-butylperoxy)-3,3,5-trimethylcyclohexane, tert-butyl peroxybenzoate, tert-butyl peroxy 3,5,5-trimethylhexanoate, dibenzyl peroxide, di(4-methylbenzoyl) peroxide, di-2,4-dichlorobenzoyl peroxide or mixtures thereof. The peroxide initiator is used in an amount ranging from 0.001 to 10 phr, based on 100 parts of butyl rubber (phr), preferably in an amount ranging from 0.01 to 3 phr, more preferably ranging from 0.01 to 0.1 phr.

With reference to the elastomers of the disclosed invention, "vulcanized" or "cured" refers to the chemical reaction that forms bonds or cross-links between the polymer chains of the elastomer. Curing of the elastomer is generally accomplished by the incorporation of the curing agents and/or accelerators, with the overall mixture of such agents referred to as the cure system or cure package.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

Non-halogenated rubbers can be cured by employing a variety of suitable cure systems. Exemplary curatives include phenolic resin cure systems, peroxide cure systems, and silicon-containing cure systems.

In one or more embodiments, the phenolic resins include those disclosed in U.S. Pat. Nos. 2,972,600, 3,287,440, and 5,952,425 which are incorporated herein by reference for purpose of U.S. patent practice.

Phenolic resin curatives can be referred to as resole resins, and include those resins made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 weight percent octyl phenol and from about 70 to about 65 weight percent nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which are referred to as alkylphenolformaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

In one or more embodiments, useful silicon-containing cure systems include silicon hydride compounds having at least two SiH groups. It is believed that these compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. For a further discussion of the use of hydrosilation to cure thermoplastic vulcanizates, reference can be made to U.S. Pat. No. 5,936,028, which is incorporated herein by reference for the purpose of U.S. patent practice. In one or more embodiments, a silicon-containing curative can be employed to cure an elastomeric copolymer including units deriving from 5-vinyl-2-norbornene.

In one or more embodiments, curatives that are useful for curing butyl rubber include those described in U.S. Pat. Nos. 5,013,793, 5,100,947, 5,021,500, 4,978,714, and 4,810,752, which are incorporated herein by reference for purpose of U.S. patent practice.

It is well accepted that polyisobutylene and conventional butyl rubber decompose under the action of organic peroxides. Here, conventional butyl rubber refers to the non-halogenated polymer of isobutylene and isoprene, wherein the isoprene content ranges from 0.5-2.5 mol %. Furthermore, U.S. Pat. No. 3,862,265 and U.S. Pat. No. 4,749,505 teach that copolymers of a $C_4$ to $C_7$ isomonoolefin with up to 10 wt. % isoprene or up to 20 wt. % para-alkylstyrene undergo a molecular weight decrease when subjected to high shear mixing. This effect is enhanced in the presence of free radical initiators such as peroxides, and is undesirable in TPV applications. The preparation of butyl-based, peroxide-curable compounds which employ the use of novel grades of high isoprene (IP) butyl rubber which can be produced in a continuous process was described in co-pending Canadian patent application 2,418,884, which is incorporated herein by reference for the purposes of U.S. patent practice. Specifically, CA 2,418,884 describes the continuous preparation of butyl rubber with isoprene levels ranging from 3 to 8 mol %. The ability to peroxide cure these novel grades of butyl rubber has been described in Canadian patent application CA 2,458,741, which is incorporated herein by reference for the purposes of U.S. patent practice.

In one embodiment, once the thermoplastic and elastomer are well mixed, a peroxide curing system is used to form the thermoplastic vulcanizate. Suitable peroxide curing systems are well known to persons skilled in the art and typically employ a thermally activated peroxide to initiate the vulcanization cross-linking reactions. The invention is not limited to a special peroxide curing system. For example, inorganic or organic peroxides are suitable. Preferred are organic peroxides such as dialkylperoxides, ketalperoxides, aralkylperoxides, peroxide ethers or peroxide esters. In one or more embodiments, useful peroxide curatives include organic peroxides. Examples of organic peroxides include, but are not limited to, di-tert-butyl peroxide, dicumyl peroxide, t-butyl-cumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, tert-butyl peroxybenzoate, tert-butyl peroxy 3,5,5-trimethylhexanoate, dibenzyl peroxide benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Peroxides might be applied advantageously in a polymer-bound form. Suitable systems are commercially available, such as Poly-Dispersion® T(VC) D-40 P from Rhein Chemie Rheinau GmbH, D (a polymer bound di-tert-butylperoxy-isopropylbenzene). Useful peroxides and their methods of use in dynamic vulcanization of thermoplastic vulcanizates are disclosed in U.S. Pat. No. 5,656,693, which is incorporated herein by reference for the purpose of U.S. patent practice. An anti-oxidant may be used in conjunction with the peroxide as part of the peroxide curing system.

In one or more embodiments, the peroxide curatives are employed in conjunction with a coagent. Examples of coagents include triallylcyanurate, triallyl isocyanurate, triallyl phosphate, sulfur, N,N'-(1,3-Phenylene)dimaleimide, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent crosslinking the mixing and dynamic vulcanization are preferably carried out in a nitrogen atmosphere.

In one embodiment, due to the goal of the elastomer being present as discrete particles in a thermoplastic domain, the addition of the curing components and the temperature profile of the components are adjusted to ensure the correct morphology is developed. Thus, if there are multiple mixing stages in the preparation of the dynamically vulcanized TPE, the curatives may be added in one or more stages. This is especially advantageous in embodiments where a peroxide initiator (or second peroxide curing system) is employed to aid in the grafting of unsaturated carboxylic anhydrides to the elastomer. The curatives may then be added just before the elastomer and thermoplastic resin are combined or even after the thermoplastic has melted and been mixed with the rubber. A subsequent curing stage with optionally different peroxide curing agents or different curing conditions may then be used to lock in the desired morphology. Although discrete rubber particle morphology in a continuous thermoplastic matrix is the preferred morphology, the invention is not limited to only this morphology and may also include morphologies where both the elastomer and the thermoplastic are continuous. Sub-inclusions of the thermoplastic inside the rubber particles may also be present.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a TPE with acceptable elastomeric dispersion sizes.

Components previously used to match the viscosity between the elastomer and thermoplastic components include low molecular weight polyamides, maleic anhydride grafted polymers having a molecular weight on the order of 10,000 or greater, methacrylate copolymers, tertiary amines and secondary diamines. Examples include maleic anhydride-grafted ethylene-ethyl acrylate copolymers (a solid rubbery material available from Mitsui-DuPont as AR-201 having a melt flow rate of 7 g/10 min measured per JIS K6710) and butylbenzylsulfonamide (BBSA). These compounds may act to increase the 'effective' amount of thermoplastic material in the elastomeric/thermoplastic compound. The amount of additive is selected to achieve the desired viscosity comparison without negatively affecting the characteristics of the TPE. If too much is present, impermeability may be decreased and the excess may have to be removed during post-processing. If not enough of the viscosity matching agent is present, the elastomer may not invert phases to become the dispersed phase in the thermoplastic resin matrix.

The elastomer is preferably provided in an amount of from 20 to 80 wt % of the thermoplastic, more preferably from 30 to 80 wt %, yet more preferably from 40 to 80 wt %. The elastomer is mixed with the thermoplastic and preferably uniformly dispersed throughout the thermoplastic in order that the thermoplastic vulcanizate formed upon peroxide curing of the mixture has substantially consistent properties throughout. Any suitable mixing method or equipment may be used that achieves uniform dispersion of the elastomer in the thermoplastic; for example, an internal mixer, a mill, or an extruder may be used. In a preferred method, the thermoplastic and elastomer are provided as pellets or beads and mixed using an extruder that produces conditions sufficient to melt at least the thermoplastic and preferably both the thermoplastic and the elastomer. The thermoplastic and the elastomer may be provided to the extruder either together or sequentially. The temperature of the thermoplastic and elastomer in the extruder during mixing is preferably at least 100° C., more preferably at least 130° C., yet more preferably at least 150° C., even more preferably at least 160° C., still more preferably at least 170° C. up to about 260° C.

In a preferred embodiment, the peroxide curing system is added to the mixed thermoplastic and elastomer in the extruder. The peroxide curing system is either mixed with the thermoplastic and elastomer prior to initiating vulcanization or concurrently therewith, depending on the temperature employed in the mixing stage of the extruder. If mixed at temperatures below that required to thermally initiate peroxide cross-linking, the temperature is raised to form the thermoplastic vulcanizate.

The thermoplastic vulcanizate may be used to create a variety of shaped articles. The shaped articles may be formed by any suitable method, for example extrusion molding, injection molding, blow molding or the like. In one embodiment, the article is selected from tire curing bladders, tire innerliners, tire innertubes, and air sleeves. In another embodiment, the article is a hose or a hose component in multilayer hoses, such as those that contain polyamide and especially polyamide 12 as one of the component layers. Other useful goods that CaO be made using compositions of the invention include air spring bladders, seals, molded goods, cable housing, and other articles disclosed in THE VANDERBILT RUBBER HANDBOOK, P 637-772 (Ohm, ed., R. T. Vanderbilt Company, Inc. 1990). The shaped article may furthermore comprise condenser caps, medical components, such as components of biomedical devices or pharmaceutical devices (eg: stoppers in medicine-containing vials, plungers in syringes, etc.) and/or in fuel cell components, such as seals.

The thermoplastic vulcanizates of the present invention may comprise mineral or non-mineral fillers of the type known to persons skilled in the art to be suitable for use with butyl rubber or butyl rubber compounds. The amounts are conventionally from 1 to 50% by weight of the thermoplastic vulcanizate. The fillers may be added to the extruder during mixing of the thermoplastic with the elastomer and/or with the elastomer itself during formation thereof. Examples of suitable fillers include carbon black, talc, silica, titanium dioxide, etc. The thermoplastic vulcanizates of the present invention can also contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry.

In preparing the TPE, other materials may be blended with either the elastomer or the thermoplastic, before the elastomer and the thermoplastic are combined in the blender, or added to the mixer during or after the thermoplastic and elastomer have already been introduced to each other. These other materials may be added to assist with preparation of the TPE or to provide desired physical properties to the TPE. Such additional materials include, but are not limited to, curatives, compatibilizers, extenders, and plasticizers.

Further features of the invention will now be described with reference to the following Examples.

Equipment

Hardness and Stress Strain Properties were determined with the use of an A-2 type durometer following ASTM D-2240 requirements. The stress strain data was generated at 23° C. according to the requirements of ASTM D-412 Method A. Die C dumbbells were injection molded from the pelletized thermoplastic elastomer compositions, and subjected to stress-strain measurements without conditioning.

Materials

All reagents, unless otherwise specified, were used as received from Sigma-Aldrich (Oakville, Ontario). The butyl rubber used in the examples were experimental grades of non-halogenated poly(isobutylene-co-isoprene) with an isoprene level of 5.5% (RB55) and 6.9% (RB70) and Mooney viscosities (ML 1+8@125° C.) between 35 and 40 MU as supplied by LANXESS Inc. Durethan CI 31 F was used as supplied by LANXESS GmbH. HVA #2™ (Co-agent) was used as supplied by DuPont Canada Inc, N-butylbenolsulfonamide (Proviplast 024) was supplied by Proviron, Irganox 1010™ (Antioxidant) and Irganox B215 were used as supplied by Ciba Specialty Chemicals Corp, Peroxan HX-45P™ (Peroxide) was used as supplied by Pergan. Maleic anhydride was used as supplied by Aldrich.

Extrusion

Materials (Comparative examples C1-C4 and inventive examples I1, I2) were compounded using a co-rotating twin-screw extruder from Leistritz with a screw diameter of 27 mm and an L/D ratio of 57 comprising 14 zones. The materials were fed into the extruder using gravimetric feeders from Brabender. The butyl rubber was ground prior to the trial and dusted with 6 wt.-% of clay to prevent its re-agglomeration. Powder mixes were prepared in a powder mixer from Eirich if applicable. The extruder was operated at a screw speed of 600 rpm (except for Example 3, where it operated at 400 rpm) and a throughput rate of 20 kg h$^{-1}$. The barrel temperatures of the extruder were set to 200-230° C. The compositions in phr of the examples and feed zones at which the individual components were fed into the extruder are summarized in Table 1.

Characterization.

After the extrusion the granules resulting from Examples were dried at 80° C. until the water content was below 0.08 wt %. For the preparation of the test specimen an Arburg 320-500 injection molding machine was utilized. After the drying process, the pellets from Examples C3 and C4 were too sticky to be processed into test specimen via injection molding. The stress strain properties were measured according to ISO 37 II using a Zwick Z010 tensile tester.

TABLE 1

Composition of TPV examples split according to the zone they were fed into the extruder. All values are phr.

| Example | Addition zone | C1 | I1 | C2 | I2 | C3 | C4 |
|---|---|---|---|---|---|---|---|
| RB 55 | 0 | 100 | 100 | | | | |
| RB70 | 0 | | | 100 | 100 | | |
| BB 2030 | 0 | | | | | 100 | 100 |
| MAH | 0 | | 2 | | 2 | | 2 |
| Peroxan HX-45 P | 0 | | 0.29 | | 0.055 | | 0.055 |

TABLE 1-continued

Composition of TPV examples split according to the zone they were fed into the extruder. All values are phr.

| Example | Addition zone | C1 | I1 | C2 | I2 | C3 | C4 |
|---|---|---|---|---|---|---|---|
| Durethan CI 31 F | 0 | 100 | 100 | 100 | 100 | 100 | 100 |
| BBSA | 0 | 50 | 50 | 50 | 50 | 50 | 50 |
| HVA-2 | 5 | 3 | 1.06 | 3 | 3 | 3 | 3 |
| Peroxan HX-45 P | 5 | 0.74 | 0.29 | 0.11 | 0.11 | 0.11 | 0.11 |
| Irganox B215 | 5 | 0.82 | 0.82 | 0.14 | 0.14 | 0.14 | 0.14 |

TABLE 2

Physical properties of compositions from Table 1.

| Example | C1 | I1 | C2 | I2 | C3 | C4 |
|---|---|---|---|---|---|---|
| Ultimate tensile [MPa] | 10.6 ± 1.0 | 16.8 ± 6.0 | 8.0 ± 0.2 | 8.0 ± 0.6 | Material could not be processed | |
| Ultimative elongation [%] | 39 ± 0 | 97 ± 0 | 85 ± 6 | 171 ± 6 | | |
| M20 [MPa] | | | 6.3 ± 0.1 | 4.8 ± 0.2 | | |
| M50 [MPa] | | | 7.5 ± 0.2 | 5.7 ± 0.3 | | |
| M100 [MPa] | | | | 6.6 ± 0.4 | | |

Examples C1, which did not contain maleic anhydride, showed a value for the ultimate elongation of 39% and a tensile strength of 10.5 MPa. Example 11 is close to identical in composition to Example C1, but it includes maleic anhydride and some additional Peroxan HX-45 P in its composition. Example 11 showed a value for the ultimate elongation of 97% and a tensile strength of 16.8 MPa, thus an increase in tensile strength and elongation at break compared to Example C1. Also, Example 11 shows a permeability coefficient of 75 ml mm m$^{-2}$ d$^{-1}$. Example 11 is hence less permeable than typical halobutyl innerliners (180 ml mm m$^{-2}$ d$^{-1}$) which is favorable for a potential application in tire inner liners.

Examples C2, which did not contain maleic anhydride, showed a value for the ultimate elongation of 85% and a tensile strength of 8.0 MPa. Example 12 is identical in composition to Example C2, with exception of an additional 2 phr of maleic anhydride and 0.055 phr of additional Peroxan HX-45 P (fed into zone 0 of the extruder) in its composition. Example 12 showed a value for the ultimate elongation of 171% and a tensile strength of 8.0 MPa, thus an increase elongation at break and an identical tensile strength if compared to Example C2. Also, Example 12 shows a permeability coefficient of 87 ml mm m$^{-2}$ d$^{-1}$. Example 12 is hence less permeable than typical halobutyl innerliners (180 ml mm m$^{-2}$ d$^{-1}$) which is favorable for a potential application in tire inner liners.

Examples C3 and C4 are identical to compositions C2 and I2, respectively, with exception of the type of butyl rubber used. In Examples C3 and C4, brominated butyl rubber was used instead of non-halogenated butyl rubber. Pellets according to Examples C3 and C4, however, could not be processed into test specimen due to the decomposition of the material after extrusion.

The examples above state that adding small amounts of unsaturated anhydrides to non-halogenated butyl rubber containing thermoplastic elastomer compositions improve materials properties.

What is claimed is:

1. A continuous process for the preparation of a thermoplastic elastomer composition, the process comprising:
   a) admixing in a first stage of a continuous mixer:
      a thermoplastic resin;
      a non-halogenated elastomer comprising repeating units derived from at least one $C_4$ to $C_7$ isomonoolefin monomer and at least 3.5 mol % of a $C_4$ to $C_{16}$ multiolefin monomer;
      a curing agent for curing the non-halogenated elastomer; and
      an unsaturated carboxylic compound having 4 to 16 carbon atoms, and selected from the group consisting of carboxylic a, carboxylic amide, carboxylic ester and carboxylic anhydride;
      to graft the carboxylic compound to the non-halogenated elastomer and form a thermoplastic elastomer composition;
   b) introducing, in a second stage of the continuous mixer subsequent to the first stage, an additional curing agent suitable for curing the non-halogenated elastomer to dynamically vulcanize the thermoplastic elastomer composition, and admixing the thermoplastic elastomer composition and the additional curing agent,
   wherein the admixing in each of the first and second stages is done at a temperature sufficient for melting the thermoplastic resin and curing the non-halogenated elastomer.

2. The process of claim 1, wherein the admixing in the second stage further comprises admixing at a temperature of 100 to 260° C. to cure the non-halogenated elastomer and dynamically vulcanize the thermoplastic elastomer composition.

3. The process of claim 2, wherein the additional curing agent comprises a first peroxide curing agent, and wherein the curing agent for the non-halogenated elastomer in the first stage comprises a second peroxide curing agent, the second peroxide curing agent being the same as or different from the first peroxide curing agent, and the admixing in the first stage further comprises admixing the second peroxide curing agent with the thermoplastic resin, the non-halogenated elastomer and the carboxylic compound in the first stage at a temperature of 100 to 260° C.

4. The process of claim 3, wherein the second peroxide curing agent is provided in an amount of 0.05 to 0.3 phr.

5. The process of claim 3, wherein the first peroxide curing agent is provided in an amount of 0.1 to 3 phr.

6. The process of claim 3, wherein the first peroxide curing agent is provided in an amount of 0.1 to 3 phr and the second peroxide curing agent is provided in a non-zero amount of less than 0.1 phr.

7. The process of claim 6, wherein the second peroxide curing agent is provided in an amount of greater than 0.01 phr.

8. The process of claim 3, wherein the first peroxide curing agent and/or the second peroxide curing agent are each independently 2,5-dimethyl-2,5-di-(tert-butylperoxy)hexyne-3, di-tert-butyl peroxide, 2,5-dimethyl-2,5-di(tert-butylperoxy)

hexane, tert-butyl cumyl peroxide, di-(2-tert-butylperoxy isopropyl)benzene, dicumyl peroxide, butyl 4,4-di-(tert-butylperoxy)valerate, 1,1-di-(tert-butylperoxy)-3,3,5-trimethylcyclohexane, tert-butyl peroxybenzoate, tert-butyl peroxy 3,5,5-trimethylhexanoate, dibenzyl peroxide, di(4-methylbenzoyl) peroxide, di-2,4-dichlorobenzoyl peroxide or mixtures thereof.

9. The process of claim 1, wherein the continuous mixer comprises an extruder.

10. The process of claim 1, wherein the thermoplastic resin is a polyamide.

11. The process of claim 1, wherein the isomonoolefin monomer is isobutene and the multiolefin monomer isisoprene.

12. The process of claim 11, wherein the isoprene is present in an amount of at least 5 mol %.

13. The process of claim 12, wherein the isoprene is present in an amount of at least 7 mol %.

14. The process of claim 1, wherein the carboxylic compound is maleic anhydride, chloromaleic anhydride, itaconic anhydride, or hemic anhydride.

15. The process of claim 1, wherein the non-halogenated elastomer is provided in a pelletized form.

16. The process of claim 1, wherein:
the additional curing agent in the second stage comprises a first peroxide curing agent, and the curing agent in the first stage comprises a second peroxide curing agent the same as or different from the first peroxide curing agent; and
the first peroxide curing agent is provided in an amount of 0.1 to 3 phr and the second peroxide curing agent is provided in an amount of 0.01 to 0.1 phr.

17. The process of claim 16, wherein:
the continuous mixer comprises an extruder;
the first peroxide curing agent and the second peroxide curing agent are each independently selected from the group consisting of 2,5-dimethyl-2,5-di(tert-butylperoxy)hexyne-3, di-tert-butyl peroxide, 2,5-dimethyl-2,5-di(tert-butylperoxy)hexane, tert-butyl cumyl peroxide, di(2-tert-butylperoxy isopropyl)benzene, dicumyl peroxide, butyl 4,4-di(tert-butylperoxy)valerate, 1,1-di-(tert-butylperoxy)-3,3,5-trimethylcyclohexane, tert-butyl peroxybenzoate, tert-butyl peroxy 3,5,5-trimethylhexanoate, dibenzyl peroxide, di(4-methylbenzoyl) peroxide, di-2,4-dichlorobenzoyl peroxide and mixtures thereof; and
the admixing in the first stage and in the second stage further comprises admixing at a temperature of 100° C. to 260° C.

18. The process of claim 17, wherein:
the thermoplastic resin is a polyamide;
the isomonoolefin monomer is isobutene and the multiolefin monomer is isoprene in an amount of at least 7 mol %; and
the carboxylic compound is maleic anhydride, chloromaleic anhydride, itaconic anhydride, or hemic anhydride.

19. A continuous process for the preparation of a thermoplastic elastomer, the process comprising:
a) in a first stage of a continuous mixer:
admixing:
a thermoplastic resin;
a non-halogenated elastomer comprising repeating units derived from at least one $C_4$ to $C_7$ isomonoolefin monomer and a $C_4$ to $C_{16}$ multiolefin monomer;
a curing agent for curing the non-halogenated elastomer; and
a $C_4$ to $C_{16}$ unsaturated cyclic anhydride;
to graft the carboxylic anhydride to the non-halogenated elastomer and form a thermoplastic elastomer composition; and
curing at least a portion of the non-halogenated elastomer;
b) in a second stage of the continuous mixer subsequent to the first stage:
admixing the thermoplastic elastomer composition and an additional curing agent suitable for curing the non-halogenated elastomer; and
curing an additional portion of the thermoplastic elastomer composition to produce a dynamically vulcanized thermoplastic elastomer.

20. The process of claim 19, wherein:
the thermoplastic resin is a polyamide;
the isomonoolefin monomer is isobutene and the multiolefin monomer is isoprene;
the carboxylic compound is maleic anhydride; and
the curing agent and the additional curing agent are each independently selected from the group consisting of 2,5-dimethyl-2,5-di(tert-butylperoxy)hexyne-3, di-tert-butyl peroxide, 2,5-dimethyl-2,5-di(tert-butylperoxy)hexane, tert-butyl cumyl peroxide, di(2-tert-butylperoxy isopropyl)benzene, dicumyl peroxide, butyl 4,4-di(tert-butylperoxy)valerate, 1,1-di-(tert-butylperoxy)-3,3,5-trimethylcyclohexane, tert-butyl peroxybenzoate, tert-butyl peroxy 3,5,5-trimethylhexanoate, dibenzyl peroxide, di(4-methylbenzoyl) peroxide, di-2,4-dichlorobenzoyl peroxide, and mixtures thereof.

* * * * *